United States Patent [19]

Naruse et al.

[11] Patent Number: 4,556,783

[45] Date of Patent: Dec. 3, 1985

[54] HEAT WELDING APPARATUS

[75] Inventors: Kazuo Naruse, Okazaki; Koji Yokoi, Shippo; Yoshiaki Kurokawa, Toyota, all of Japan

[73] Assignees: Trinity Industrial Corporation, Tokyo; Toyota Motor Corporation, Toyota, both of Japan

[21] Appl. No.: 551,604

[22] Filed: Nov. 14, 1983

[51] Int. Cl.[4] ........................ F27B 9/06; F27D 11/00; B65G 47/24

[52] U.S. Cl. .................................... 219/388; 219/411; 219/354; 198/409

[58] Field of Search ............... 219/354, 388, 405, 411, 219/390; 198/409, 502, 389, 395

[56] References Cited

U.S. PATENT DOCUMENTS

| | | | |
|---|---|---|---|
| 1,776,823 | 9/1930 | Summey | 219/388 |
| 1,869,639 | 8/1932 | Washburne | 198/409 |
| 2,866,548 | 12/1958 | Simpson | 198/395 |
| 3,240,915 | 3/1966 | Carter | 219/405 |
| 3,249,741 | 5/1966 | Mills | 219/405 |
| 3,260,363 | 7/1966 | Vukosic | 198/398 |
| 3,433,966 | 3/1969 | Letch | 198/502 |
| 3,683,154 | 8/1972 | Kipple | 219/405 |
| 4,208,573 | 6/1980 | Risse | 219/405 |
| 4,276,465 | 6/1981 | Flavio | 219/388 |
| 4,363,955 | 12/1982 | Gauthier | 219/411 |

FOREIGN PATENT DOCUMENTS

| | | | |
|---|---|---|---|
| 2067510 | 7/1981 | United Kingdom | 198/409 |
| 509506 | 4/1976 | U.S.S.R. | 198/409 |

*Primary Examiner*—C. L. Albritton
*Assistant Examiner*—Teresa J. Walberg
*Attorney, Agent, or Firm*—Wenderoth, Lind & Ponack

[57] ABSTRACT

A heat welding apparatus for bonding a heat-meltable sheet, such as an asphalt sheet, to a substrate. The apparatus has a chamber having an inlet and an outlet on opposite sides thereof and an exhaust duct in its upper portion for exhausting gases generated during welding, a conveyor mechanism extending through the inlet and outlet of the chamber for intermittently conveying a laminated structure of the substrate and the heat-meltable sheet, and near infrared radiators for heating the laminated structure disposed respectively above and below the laminated structure which has been fed into the chamber, and stopped thereat, by the conveyor mechanism.

5 Claims, 6 Drawing Figures

HEAT WELDING APPARATUS

BACKGROUND OF THE INVENTION (1) Field of the Invention

This invention relates to a heat welding apparatus, and more specifically, to an apparatus for bonding a heat-meltable sheet rapidly to a substrate by utilizing near infrared radiation.

(2) Description of the Prior Art

In the prior art, a dash panel for separating the passenger compartment of an automobile from an engine compartment therein is made by bonding an asphalt sheet having a thickness of several millimeters as a soundproof antivibratory material to a steel sheet. Methods for bonding which have previously gained practical acceptance include bonding by an adhesive, heat welding by the Joule's heat generated by a high-frequency induction current, or heat welding using far infrared rays.

The method of bonding with an adhesive, however, has the defect that the adhesive is expensive, expert skills are required for coating the adhesive and bonding a fusible sheet, the number of steps is large and the method is time-consuming. The high frequency welding method has a reduced cost, but has the defect that non-uniformity in welding tends to occur, and by re-heating in the subsequent coating and drying steps, the asphalt sheet is sometimes peeled or melted. The heat welding method using far infrared rays also has defects. The temperature elevating time at the time of starting the heating of a far infrared ray source is relatively long. Hence, when a sheet welding apparatus is directly connected to a production line, the far infrared ray source must be started well before the start of operation of the production line. When for some reason, the entire production line or that part of the line to which the sheet welding apparatus is connected stops, the far infrared ray source is taken out of operation. When, however, the operation of the line is resumed the workpieces cannot be immediately heated, and the operational efficiency of the entire production line is reduced. Hence, the sheet welding apparatus cannot be conveniently incorporated in the production line.

The present inventors have found that by utilizing near infrared radiation for the heat bonding of asphalt sheet to a dash panel as described above, the heat welding operation is completed within a short period of time, and consequently, the operation of heat welding the asphalt sheet to the dash panel can be directly connected to a production line such as an automobile assembly line.

SUMMARY OF THE INVENTION

According to this invention, there is provided a heat welding apparatus for bonding a heat-meltable sheet to a substrate, said apparatus comprising

- a chamber having an inlet and an outlet on opposite sides thereof and an exhaust duct in its upper portion for exhausting gases generated during welding,
- a conveyor mechanism extending through the inlet and outlet of the chamber for intermittently conveying a laminated structure of the substrate and the heat-meltable sheet, and
- near infrared radiators for heating the laminated structure disposed respectively above and below the laminated structure which has been fed into the chamber, and stopped therein, by the conveying mechanism.

DETAILED DESCRIPTION OF THE PREFERRED EMBODIMENTS

Figure 1:
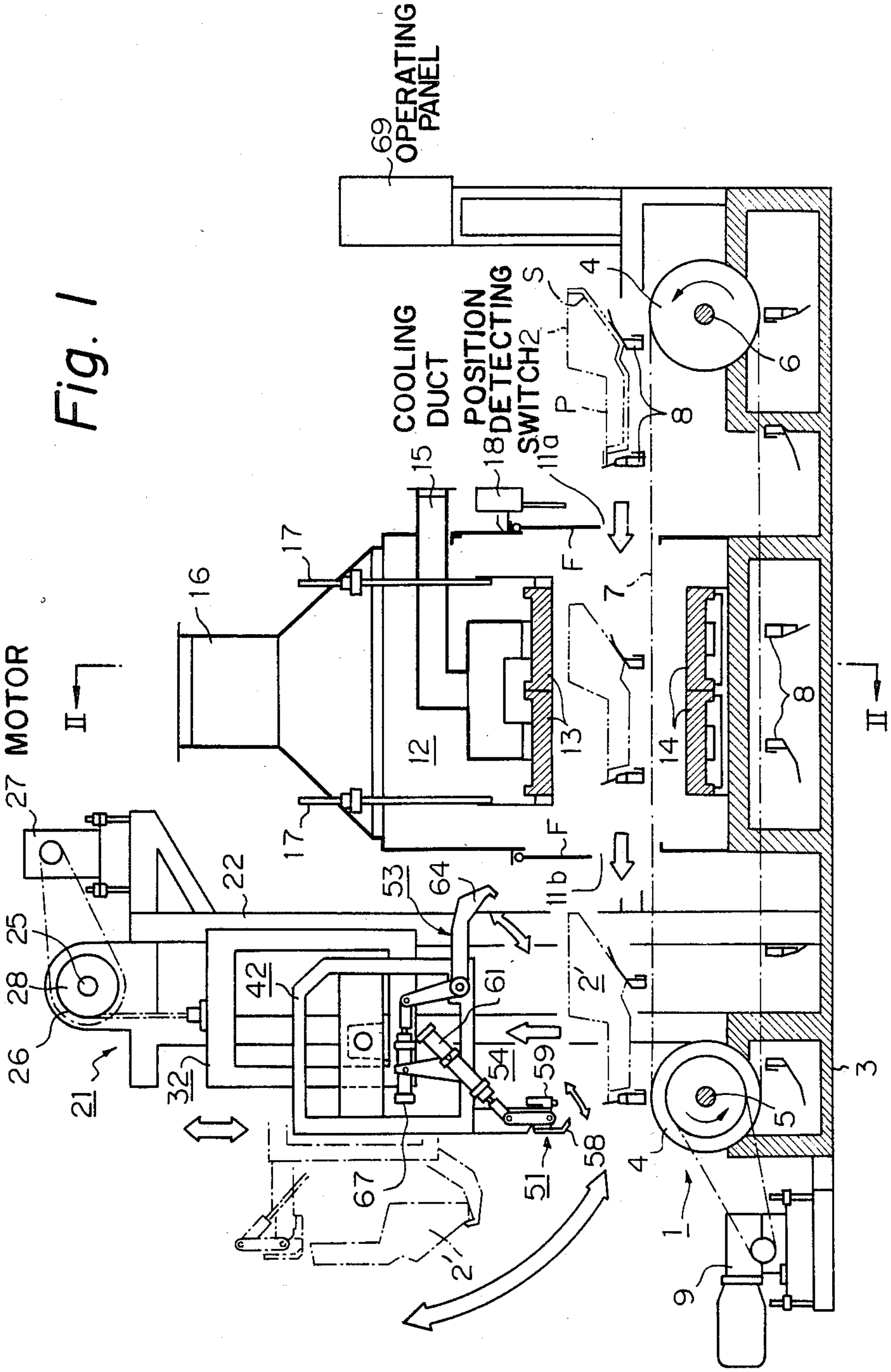
FIG. 1 is a sectional view showing one embodiment of the heat welding apparatus of this invention.
Figure 2:
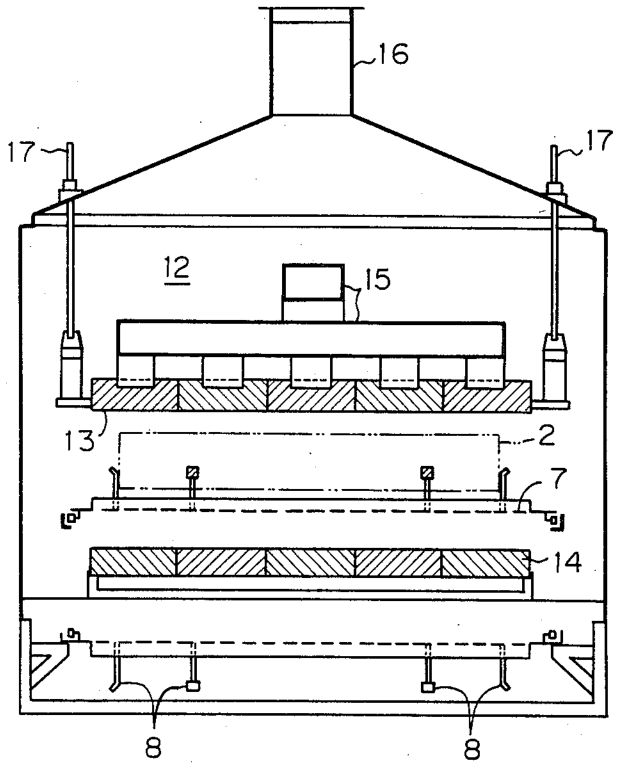
FIG. 2 is a sectional view taken on line II—II of FIG. 1.

In FIGS. 1 and 2, the apparatus of this invention, roughly stated, is comprised of a conveyor mechanism 1, a chamber 12 and near infrared radiators 13 and 14 within the chamber.

In the drawing, the conveyor device 1 is for conveying a workpiece 2 and is driven intermittently at predetermined time intervals required for welding in a heating device 11 to be described. The conveyor mechanism 1 is comprised of rotating shafts 5 and 6 having sprockets 4 and supported respectively on the left and right end portions of a base stand 3, an endless mesh belt 7 having a pair of endless chains at its opposite sides and stretched over the sprockets 4 of the two rotating shafts, a plurality of equally spaced workpiece supporting members 8, and a motor 9 for intermittently driving the rotating shaft 5 counterclockwise.

One example of the workpiece 2 is a dash panel for separating the passenger compartment of an automobile from an engine compartment. The dash panel is a laminated structure composed of a substrate (P) such as a press-formed steel sheet and an asphalt sheet (S) to be welded to its inside surface as a soundproof antivibratory material.

A heating chamber 12 is disposed in the path of transfer of the conveyor mechanism 1, and in the heating chamber 12, an upper near infrared radiator 13 and a lower near infrared radiator 14 opposing each other with the workpiece 2 therebetween are provided. Furthermore, a cooling duct 15 for cooling the near infrared radiators 13 and 14 and an exhaust duct 16 for exhausting noxious gases generated during the welding of the sheet (S) are also provided within the heating chamber 12. The upper infrared radiator 13 is supported by height-adjustable supporting rods 17 suspended from the ceiling portion of the heating chamber 12, and its vertical position can be adjusted according to the size of the workpiece 2.

An inlet 11*a* and an outlet 11*b* are formed on the opposite sides of the heating chamber 12. The conveying belt 7 extends through the inlet and the outlet. A position detecting switch 18 for detecting the position of the workpiece 2 is provided at the inlet 11*a*. The switch 18 is actuated when the workpiece 2 is not placed in a normal condition on the belt 7, and thereby stops the movement of the belt.

In the present invention, the following marked advantages are achieved by using near infrared radiation for the heat welding of the heat-meltable sheet (S) to the substrate (P).

The near infrared radiation has a higher heat energy density than far infrared radiation, etc., and the heating time can be shortened. As a result, high productivity can be obtained, and the apparatus can be small-sized. In comparison with the high-frequency induction heating, the near infrared radiation is free from non-uniformity of heating and makes possible uniform heating. Furthermore, in the near infrared heating device, the temperature elevating time is shorter at the time of starting operation than in the far infrared heating device, and the near infrared heating device is ready for operation immediately after applying power. Hence, there is no loss of time.

Furthermore, in the present invention, the near infrared radiators 13 and 14 are provided vertically above and below, i.e. on opposite sides of, the workpiece 2 to be introduced intermittently. Hence, the workpiece 2 is heated from both sides, and uniform heating can be effected within short periods of time. In particular, when the heat-meltable sheet is an asphalt sheet, the sheet has a good ability to absorb heat waves, and therefore, a very high heat efficiency can be obtained.

Furthermore, by providing the radiators 13 and 14 within the chamber 12, dissipation of the heat as well as gases generated during heating can be prevented. From this viewpoint, it is desirable to prevent dissipation of heat from the inlet 11*a* and the outlet 11*b* while permitting easy incoming and outgoing of the workpiece, by securing flaps F to the inlet 11*a* and the outlet 11*b* of the chamber 12 through hinges.

In the present invention, there may be used any desired near infrared radiator which has a maximum energy distribution at a wavelength of 0.5 to 2 μm, particularly 1 to 1.5 μm. A preferred radiator is one called a near infrared halogen lamp. Since this lamp directly radiates near infrared rays from filaments, it has the advantage that its energy efficiency is as high as at least 85%, and the starting time (rising time) required until the radiation of the maximum energy is as short as about 1 second. This lamp is sold by Phillips Company as an infrared lamp. The energy efficiency of this lamp may, of course be increased by attaching a reflector to it.

According to the apparatus of this invention, the product formed by the aforesaid heat-treatment, namely the fused laminated structure of the substrate and the sheet, is immediately fed to a production line such as an automobile assembly line. For this purpose, a product withdrawing mechanism 21 is provided in proximity to the outlet 11*b* of the heating chamber 12, and the product on the conveying mechanism 1 is withdrawn while it is still hot and rotated into a position suitable for feeding it to the production line while it cools. This cooling may be effected by allowing the product to stand in the ambient atmosphere. Or it may be effected forcibly by, for example, blowing air, etc. against it.

The withdrawing device 21 has a gate-like supporting post 22 22*a*, which are connected by top piece 22*b* which is upstanding from the base stand 3 with the mesh belt 7 therebetween, and a rotating shaft 25 supported by bearing 23 and 24 is rotatably mounted on the upper end portions of the support posts 22. The rotating shaft 25 is connected to a motor 27 through a torque limiter 26 and can be rotated in a normal and a reverse direction. Sprockets 28 and 29 are fixedly secured inwardly of the bearings 23 and 24 to the rotating shaft 25. Chains 30 and 31 are engaged with the sprockets 28 and 29 respectively, and an elevator frame 32 is secured to the lower ends of the chains 30 and 31. A balance weight 33 is secured to the rotating shaft 25 through a chain 34 to maintain a balance with the load of the elevator frame 32.

The elevator frame 32 is constructed of a box-like frame 36 having a recess 35 centrally at its lower end. It is guided without oscillation by both side plates 22*a* of the support frame 22 through guide rollers 37. Its two end portions facing the recess 35 have secured thereto bearings 38 and 39, and a revolving frame 41 is supported in the bearings 38 and 39.

Figure 3:
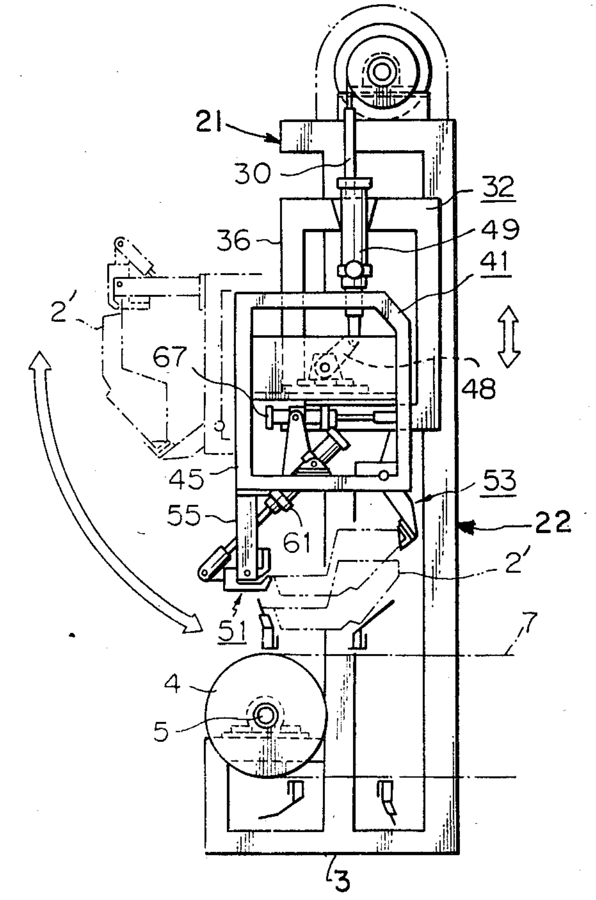
FIGS. 3 and 4 are a front elevation and a right side elevation respectively showing the state in which the product is being held by a withdrawing device.
Figure 4:
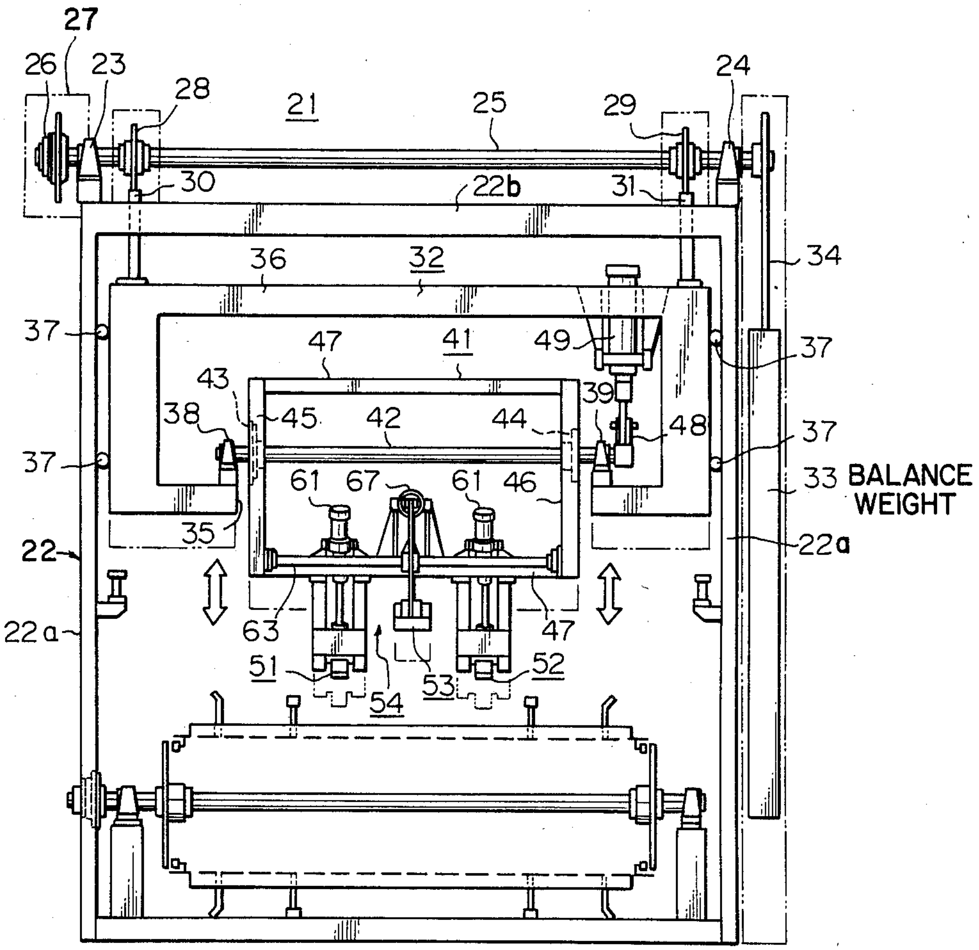

The revolving frame 41 has a pair of rectangular plate members 43 and 44 fixed secured to a revolving shaft 42, and nearly square frame members 45 and 46 are fixed the end portions of these rectangular plate members 43 and 44. The four corners of the frame members 45 and 46 are linked by linking rods 47. The piston rod of a pneumatic cylinder 49 is connected to the revolving shaft 42 through a link 48. By the actuation of the cylinder 49, the revolving frame 41 is revolved from the position shown by the solid lines in FIG. 3 to a workpiece delivery position shown by chain lines which is about 90° displaced in the clockwise direction. The cylinder 49 is revolvably supported by the elevator frame 32.

Beneath the revolving frame 41 is disposed a holding tool 54 composed of a pair of chucking claws 51 and 52 and a clamp claw 53.

Figure 5:
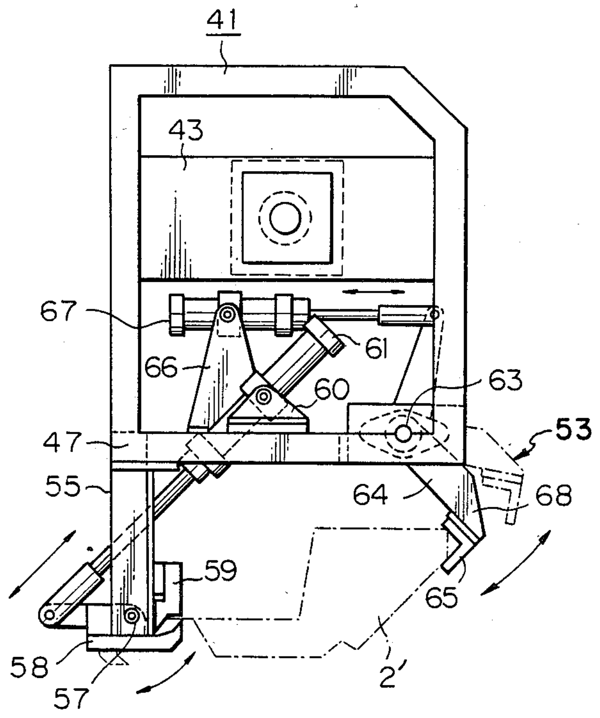
FIGS. 5 and 6 are an enlarged front elevation and a right side elevation respectively showing a revolving frame.
Figure 6:
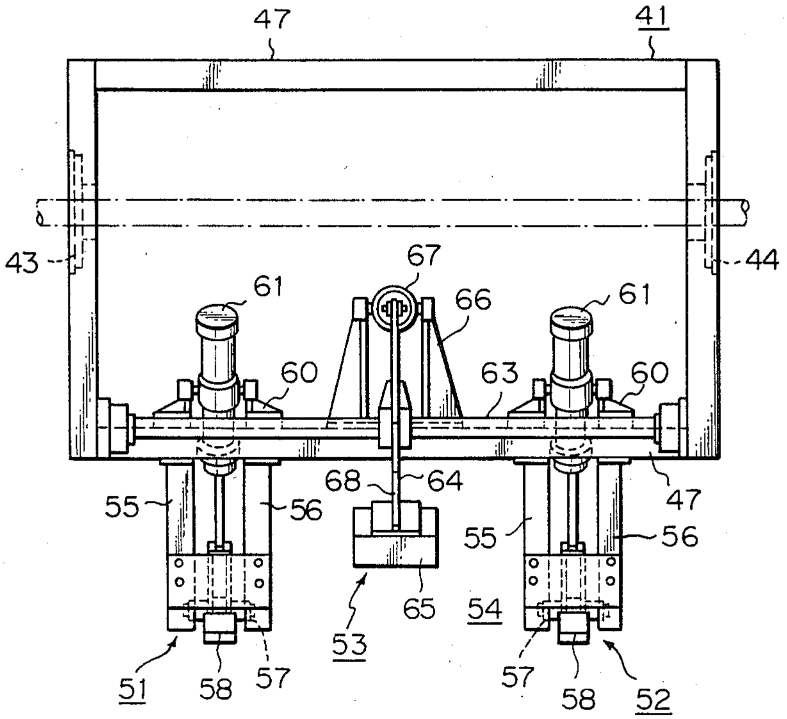

The chucking claws 51 and 52, as shown in FIGS. 5 and 6, are spaced at a distance corresponding to the size of the workpiece 2, i.e. the product 2', along the linking rod 47 located below and to the left on the revolving frame 41. Each has a revolving claw 58 pivotally secured to a shaft 57 fixed to the lower end portions of a pair of support posts 55 and 56 suspended from the linking rod 47 at a predetermined interval. A fixed receiving plate 59 for holding the end edge of the product 2' in cooperation with the revolving claw 58 is disposed on the right side of each of the support posts 55 and 56.

The revolving claws 58 are revolved by a pneumatic cylinder 61 supported on a bearing 60 disposed on the revolving frame 41 between an open position at which each claw is parallel to the support posts 55 and 56 and a holding position displaced therefrom by an angle of about 90° in the counterclockwise direction.

The clamp claw 53 has a revolving arm 64 pivotally secured to the central part of a shaft 63 bridged at the right side lower surface of the revolving frame 41, and a gripping piece 65 is disposed at the forward end of the revolving arm 64. The revolving arm 64 is revolved by a pneumatic cylinder 67 pivotally supported on a bearing 66 fixed to the revolving frame 41 between an open position at which a lever portion 68 having the gripping piece 65 disposed therein is located nearly horizontally (phantom lines, FIG. 5) and a clamp position displaced by an angle of about 30° therefrom in the clockwise direction.

To the left of the withdrawing device 21, a suspending transferring device (not shown) is disposed to receive the product 2' maintained perpendicular by the withdrawing device 21 as shown by chain lines in FIG. 1 and transfer it to an automobile body mounting position. The reference numeral 69 designates an operating panel provided at the right end portion of the base stand 3 for controlling the operations of the various devices.

The operation of the apparatus of this invention having the structure described above will now be described.

First, the workpiece 2, e.g. an asphalt sheet S, is brought into intimate contact with a sheet bonding portion of the substrate P, and in this state, the workpiece 2 is placed horizontally on the setting member 8 on the belt 7 at a position ahead of the heating chamber 12.

The workpiece 2 placed on the belt 7 is conveyed into the heating chamber 12 by the intermittent driving of the belt 7 at predetermined intervals. When the workpiece 2 is not maintained in a normal horizontal position at the time of conveying, this is detected by the position detecting switch 18 disposed at the inlet 11*a* of the heating chamber 12, thereby stopping the belt 7. After the position of the workpiece 2 is corrected to a normal one, the belt 8 is again started.

The workpiece 2 which has been carried into the heating chamber 12 is heated to a required temperature by the near infrared radiators 13 and 14 disposed vertically opposed to each other to melt the bonding surface of the asphalt sheet S. When the asphalt sheet S becomes molten, it is conveyed together with the substrate P out of the heating chamber 12 by the belt 7, and moved to the withdrawing device 21. During this time, the product 2' is cooled, and the asphalt sheet S is bonded to the sheet welding portion of the substrate P in the solidified state.

When the product 2' is moved to the withdrawing device 21, the motor 27 is rotated in a normal direction to lower the elevator frame 32. When the chucking claws 51 and 52 and the clamp claw 53 reach a position facing the product 2', the motor 27 is stopped to stop the lowering of the elevator frame 32. Then, the pneumatic cylinder 61 is actuated to revolve the revolving claws 58 counterclockwise. When the revolving claws 58 reach their holding position shown by solid lines in FIG. 5, the end edges of the product 2' are held by the revolving claws 58 and the fixed receiving plates 59. At that time, the pneumatic cylinder 67 is actuated to revolve the revolving arm 64 clockwise. When the revolving arm 64 reaches the clamp position shown by the solid lines in FIG. 5, the right side portion of the product 2' is held by the gripping piece 65, and the product 2' is held by the chucking claws 51 and 52 and the clamp claw 53. Then, the motor 27 is rotated in the reverse direction to raise the elevator frame 32 while it is holding the product 2'. When the elevator frame 32 reaches the position at which the revolving of the revolving frame 41 is permitted, the motor 27 is stopped to stop the raising of the elevator frame 32. Then, the pneumatic cylinder 49 is actuated to revolve the revolving shaft 42 counterclockwise through the link 48, whereby the revolving frame 41 is revolved to the delivery position at which the product 2' is maintained perpendicular, as shown by the chain lines in FIG. 3.

Then, the suspending transferring device (not shown) arrives at a position inwardly of the product 2' and clamps the product 2', whereupon the pneumatic cylinders 61 and 67 are actuated reversely and the piston rods are contracted. Thus, the revolving claws 58 and the revolving arm 64 are revolved respectively to the open position to release the holding of the product 2'. Then, as the product 2' is transferred by the suspending transferring device, the pneumatic cylinder 49 is actuated so as to contract the piston rod, and the revolving frame 41 is returned to the original position.

The above operation is repeated every time a workpiece 2 is placed on the belt 7.

When the production line connected to the withdrawing device 21 is stopped for some reason and the workpiece 2 is present in the heating chamber 12 at the time of stoppage, the individual devices are operated until the heating of that workpiece 2 is finished. Then, after the workpiece 2, i.e. the product 2', is taken out from the heating chamber 12, the belt 8 is stopped, power supply to the near infrared radiators 13 and 14 in the heating chamber 12 is stopped, and the driving of the withdrawing device 21 is also stopped. When the production line is to be again operated, the heat welding apparatus as a whole can be operated nearly at the same time as the resumption of the operation of the production line because the use of the near infrared radiators 13 and 14 makes it possible to elevate the temperature to the required one within a very short period of time.

According to the present invention described above, the use of near infrared radiators as a heating device enables the temperature elevating time to be shortened. Hence, the heat welding apparatus can be incorporated in a production line. In addition, the workpiece can be conveyed to the heating chamber in a position suitable for sheet welding, and after the sheet welding, the product can be delivered to the transferring device by the withdrawing device while it assumes an optimal position for the next step. Thus, this permits saving of time and labor for storing the welded products as a stock.

Although the above embodiments have been described with regard to the case in which the holding tool 54 composed of the pair of chucking claws 51 and 52 and the clamp claw 53 is disposed in the withdrawing device 21, the structure of the holding tool is not limited to this specific embodiment, and other types of holding mechanisms such as one for attracting and holding the product by utilizing an electromagnet may also be used.

The workpiece 2 is not limited to a dash panel, and the present invention is also appliable to the welding of a fusible sheet to a door panel, a fender and other metalic materials.

What is claimed is:

1. A heat bonding apparatus for bonding an asphalt sheet to a press-formed steel sheet to form a dash panel for separating the passenger compartment of an automobile from an engine compartment thereof with the asphalt sheet serving as soundproof antivibratory material, said apparatus comprising:

a chamber having an inlet and an outlet on opposite sides thereof and an exhaust duct in the upper portion thereof for exhausting gases generated during bonding;

a conveyor mechanism extending through said chamber from the inlet to the outlet for carrying an assembly of the press-formed steel sheet and the asphalt sheet laminated on said steel sheet through said chamber;

conveyor driving means connected to said conveyor mechanism for intermittently driving said conveyor mechanism;

near infrared radiators for heating the assembly disposed respectively above and below said conveyor mechanism for heating an assembly which has been fed into the chamber and stopped therein by said conveyor mechanism and said conveyor driving mechanism, each of said radiators being a near infrared halogen tube having a maximum energy distribution at a wavelength of 0.5 to 2 $\mu$m and having a cooling duct for cooling the radiator; and a withdrawing mechanism disposed in proximity to the outlet of said chamber for gripping the dash board product composed of the steel sheet and the asphalt sheet heat bonded to the steel sheet while said product is still hot and withdrawing it from said conveyor mechanism and rotating it to a position for delivery to an assembly line as it cools.

2. The apparatus of claim 1 wherein the withdrawing mechanism is comprised of a chucking mechanism for gripping the product, an elevator mechanism for moving the chucking mechanism up and down, and a revolving mechanism for revolving the chucking mechanism at its elevated position.

3. The apparatus as claimed in claim 1 further comprising detecting means at the inlet of said chamber for detecting the position of the laminate on the conveyor mechanism and connected to said conveyor driving means for, when the detected position is not normal, stopping the driving of said conveyor mechanism.

4. A heat bonding apparatus as claimed in claim 1 in which said withdrawing mechanism comprises:

a gate-like supporting frame which is upstanding with the outlet of said chamber positioned therebetween;

a rotating shaft rotatably mounted on the upper end portion of said supporting post;

a motor connected to said shaft for rotating said shaft in normal and reverse directions;

sprockets fixedly secured near both ends of said rotating shaft and chains engaged over said sprockets;

a box-like elevator frame supported by said chains and having a central recess at the lower side thereof;

a revolving shaft rotatably mounted on said elevator frame and extending in the horizontal direction;

a first pneumatic cylinder connected to said revolving shaft for revolving said revolving shaft from a normal position to a delivery position which is displaced about 90 from said normal position;

a revolving frame fixedly secured to said revolving shaft and positioned in said recess of said elevator frame; and a holding means on said revolving frame for gripping the product and composed of a pair of chucking claws and a clamp claw which are disposed on the bottom of said revolving frame, and second pneumatic cylinders connected to said claws, whereby said motor can be rotated to lower said elevator frame, said second pneumatic cylinders can be actuated to hold the product by the chucking claws and clamp claw, then said motor can be rotated to raise said elevator frame, and finally said first pneumatic cylinder can be actuated to revolve said revolving frame to the delivery position at which the product is maintained perpendicular to the horizontal.

5. A withdrawing apparatus for gripping a dash panel product constituted by a press-formed steel sheet and an asphalt sheet heat bonded thereon and withdrawing it from a conveyor mechanism of a heat bonding appratus while said dash panel product is still hot, which said withdrawing mechanism comprises:

a gate-like supporting frame which is upstanding with the outlet of the heat bonding apparatus to be positioned therebetween;

a rotating shaft rotatably mounted on the upper end portion of said supporting post;

a motor connected to said shaft for rotating said shaft in normal and reverse directions;

sprockets fixedly secured near both ends of said rotating shaft and chains engaged over said sprockets;

a box-like elevator frame supported by said chains and having a central recess at the lower side thereof;

a revolving shaft rotatably mounted on said elevator frame and extending in the horizontal direction;

a first pneumatic cylinder connected to said revolving shaft for revolving said revolving shaft from a normal position to a delivery position which is displaced about 90 from said normal position;

a revolving frame fixedly secured to said revolving shaft and positioned in said recess of said elevator frame; and a holding means on said revolving frame for gripping the product and composed of a pair of chucking claws and a clamp claw which are disposed on the bottom of said revolving frame, and second pneumatic cylinders connected to said claws, whereby said motor can be rotated to lower said elevator frame, said second pneumatic cylinders can be actuated to hold the product by the chucking claws and clamp claw, then said motor can be rotated to raise said elevator frame, and finally said first pneumatic cylinder can be actuated to revolve said revolving frame to the delivery position at which the product is maintained perpendicular to the horizontal.

* * * * *